(12) United States Patent
Cao et al.

(10) Patent No.: US 7,635,462 B2
(45) Date of Patent: Dec. 22, 2009

(54) METHOD OF MAKING POROUS CRYSTALLINE MATERIALS

(75) Inventors: Guang Cao, Branchburg, NJ (US); Matu J. Shah, Hackettstown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 297 days.

(21) Appl. No.: 11/899,777

(22) Filed: Sep. 7, 2007

(65) Prior Publication Data

US 2008/0071128 A1 Mar. 20, 2008

Related U.S. Application Data

(60) Provisional application No. 60/845,033, filed on Sep. 15, 2006.

(51) Int. Cl.
*C01B 39/02* (2006.01)
*C07C 7/00* (2006.01)

(52) U.S. Cl. ............... 423/713; 423/704; 208/46

(58) Field of Classification Search ........... 423/704, 423/713; 858/899
See application file for complete search history.

(56) References Cited

U.S. PATENT DOCUMENTS 5,202,014 A * 4/1993 Zones et al. .......... 208/46
2006/0180501 A1 * 8/2006 Da Silva et al. .......... 208/208 R

OTHER PUBLICATIONS

Corma, A et al.; "A large-cavity zeolite with wide pore windows and potential as an oil refining catalyst," Nature, Nature Publishing Group, London, GB, vol. 418, Aug. 2002, p. 514-517.
Arribas, M.A. et al.; "Hydrogenation and ring opening of Tetralin over bifunctional catalysts based on the new ITQ-21 zeolite," Applied Catalysis A: General, Elsevier Science, Amsterdam, NL, vol. 273, No. 1-2, Oct. 8, 2004, pp. 277-286.
Van Der Waal, J.C. et al.: "Synthesis and characterization of aluminum-free zeolite titanium beta using di(cyclohexylmethyl)dimethylammonium as a new and selective template," Microporous and Mesoporous Materials, Elsevier Science Publishing, New York, U.S., vol. 25, No. 1-3, Dec. 9, 1998, p. 43-57.
Li, Q et al.; "Enthalpies of formation of Ge-zeolites: ITQ-21 and ITQ-22," Microporous and Mesoporous Materials, Elsevier Science Publishing, New Yrok, US, vol. 74, No. 1-3, Sep. 20, 2004, p. 87-92.
Diaz, et al.; "Synthesis and characterization of hybrid organozeolites with high organic content," Microporous and Mesoporous Materials, Elsevier Science Publishing, New York, US, vol. 93, No. 1-3, Jul. 28, 2006, p. 180-189.

* cited by examiner

*Primary Examiner*—Robert J Hill, Jr.
*Assistant Examiner*—Brian McCaig
(74) *Attorney, Agent, or Firm*—Paul E. Purwin; Liza Montalvo

(57) ABSTRACT

The present invention relates to new methods of making crystalline materials isostructural to ITQ-21, as well as to new crystalline materials obtainable by such methods, and their use in hydrocarbon conversion processes. In one of its aspects, the invention relates to a method of making a crystalline material iso-structural to ITQ-21, the method comprising:

(a) providing a synthesis mixture comprising water, at least one source of germanium, at least one source of a tetravalent element X other than germanium, at least one structure directing agent R, optionally at least one source of trivalent element Y and optionally at least one source of fluoride, wherein the structure directing agent R is a compound of formula $C^1C^2R^1R^2N^+A^-$ (I), in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine, (b) forming said crystalline material from the synthesis mixture;

(c) recovering said crystalline material.

45 Claims, 4 Drawing Sheets

METHOD OF MAKING POROUS CRYSTALLINE MATERIALS

This application claims the benefit of U.S. Provisional Application No. 60/845,033 filed Sep. 15, 2006.

FIELD OF THE INVENTION

The present invention relates to new methods of making crystalline materials isostructural to ITQ-21, as well as to new crystalline materials obtainable by such methods, and their use in hydrocarbon conversion processes.

BACKGROUND OF THE INVENTION

Zeolites and zeolite-like materials are porous crystalline materials made of tetrahedral oxide building blocks, bonded through tetrahedral corner oxygen atoms. Many natural and synthetic zeolites or zeolite-like materials with distinct crystal structures are currently known and are recognizable by distinct and characteristic X-ray diffraction patterns. The zeolite or zeolite-like crystal structures contain cages, cavities and channels that are characteristic for each crystal framework type, making zeolites and zeolite-like materials useful as shape and size selective adsorbents and catalysts. Zeolites and zeolite-like materials are used in many commercial processes, particularly in petroleum refining and petrochemical processes.

For petroleum refining, zeolites having large pore sizes and/or a three-dimensional pore network containing large cavities are of particular interest, as such large pore materials allow good diffusivity throughout the crystal structure.

Recently a research group from the University of Valencia reported the preparation of a new large pore zeolite, known as ITQ-21, which exhibits good performance as a catalyst for converting petroleum feedstocks into diesel, gasoline and other hydrocarbons of interest to the petrochemical industry (A. Corma et al., Nature, Vol. 418, August 2002, pp. 514-517; U.S. Pat. Nos. 6,849,248; 6,998,037; 7,008,612 and US Patent Application Publication Nos. 2005/0165,267; 2005/0192469; 2005/018259, all incorporated herewith by reference). As reported by A. Corma, et al., ITQ-21 is a porous crystalline material having a three-dimensional channel system, with circular openings comprising 12-membered rings. The three straight channels intersect at large inner cages, which are nearly spherical, with about 1.18 nm in diameter. ITQ-21 is identified in U.S. Pat. Nos. 6,849,248; 6,998,037; 7,008,612 and in US Patent Application Publication Nos. 2005/0165,267; 2005/0192469; 2005/018259 as a crystalline material giving, in its calcined form, an X-ray diffraction pattern with the most characteristic diffraction peaks identified in Table 1, in which d are interplanar spaces in Angstrom and the relative intensity of the lines is calculated as a percentage with respect to the most intense peak, with vs being a very strong relative intensity of 80-100, m being a medium intensity of 40-60, and w being a weak intensity of 20-40.

TABLE 1

| 2θ (°) (±0.3) | d (±0.3 A) | Relative Intensity |
|---|---|---|
| 6.4 | 13.64 | vs |
| 11.2 | 7.87 | vs |
| 18.4 | 4.82 | w |
| 19.6 | 4.55 | m |
| 21.6 | 4.11 | m |
| 26.3 | 3.41 | m |
| 29.3 | 3.04 | w |

Up to now, ITQ-21 has been prepared from reaction mixtures containing water, optionally an oxide or another source of at least one trivalent X, conveniently Al, an oxide or another source of a tetravalent element or elements Y, conveniently Si, a source of Ge, such as $GeO_2$, and N(16)-methylsparteinium hydroxide as structure directing agent. The reaction mixture can comprise fluoride or hydroxyl ions. So far, N(16)-methylsparteinium hydroxide is the only structure-directing agent reported as successfully producing ITQ-21.

We have now found that crystalline zeolites iso-structural with ITQ-21 may be obtained from reaction mixtures that use organic structure directing agents other than N(16)-methylsparteinium hydroxide. One of the advantages of these organic structure directing agents is that they are conveniently available for commercial scale synthesis. Another advantage, is that these structure directing agents allow the manufacture of very small crystallites of zeolites that are iso-structural with ITQ-21. Other advantages of the invention are discussed in the detailed description of the invention and illustrative examples.

SUMMARY OF THE INVENTION

A first embodiment of the invention relates to a method of making a crystalline material iso-structural to ITQ-21, the method comprising:
(a) providing a synthesis mixture comprising water, at least one source of germanium, at least one source of a tetravalent element X other than germanium, at least one structure directing agent R, optionally at least one source of trivalent element Y and optionally at least one source of fluoride, wherein the structure directing agent R is a compound of formula $C^1C^2R^1R^2N^+A^-$ (I), in which
  $C^1$ and $C^2$ each independently represent a substituted or unsubstituted cyclohexyl or cyclopentyl group,
  $R^1$ and $R^2$ each independently represent a methyl group, an ethyl group or a propyl group, or $R^1$ and $R^2$ together with the nitrogen atom they are connected to form a ring containing 5 or 6 atoms, and
  A represents hydroxyl, fluorine, chlorine, bromine or iodine,
(b) forming said crystalline material from the synthesis mixture;
(c) recovering said crystalline material.

In another embodiment, the invention relates to a crystalline material isostructural to ITQ-21 having a composition involving the molar relationship, on an anhydrous basis, $$XO_2 : aGeO_2 : bY_2O_3 : cR : dF$$

wherein X is a tetravalent element other than germanium, Y is a trivalent element, R is a compound of formula $C^1C^2R^1R^2N^+$ $A^-$ (I), in which
  $C^1$ and $C^2$ each independently represent a substituted or unsubstituted cyclohexyl or cyclopentyl group,
  $R^1$ and $R^2$ each independently represent a methyl group, an ethyl group or a propyl group, or $R^1$ and $R^2$ together with the nitrogen atom they are connected to form a ring containing 5 or 6 atoms, and
  A represents hydroxyl, fluorine, chlorine, bromine or iodine, and wherein a ranges from about 0.001 to about 1.0; b ranges from about 0 to about 1.0; c ranges from about 0.01 to about 0.5; and d ranges from about 0.1 to about 1.0.

In a further embodiment, the invention relates to a crystalline material iso-structural to ITQ-21 having the composition involving the molar relationship, on an anhydrous basis $$kXO_2 : lGeO_2 : mY_2O_3$$

in which X is a tetravalent element other than germanium, Y is a trivalent element, k, l and m respectively represent the molar ratios of $XO_2$, $GeO_2$ and $Y_2O_3$, in the porous crystalline material, and in which l/k ranges from about 0.001 to about 1.0 and m/k ranges from about 0 to about 1.0, wherein the crystalline material has crystallite sizes ranging from 3 nm to less than 100 nm.

In yet another embodiment, the invention relates to a hydrocarbon conversion process comprising the step of contacting a hydrocarbon feedstock with a catalyst comprising a crystalline material according to any aspect of the invention.

DETAILED DESCRIPTION OF THE INVENTION

Figure 1:
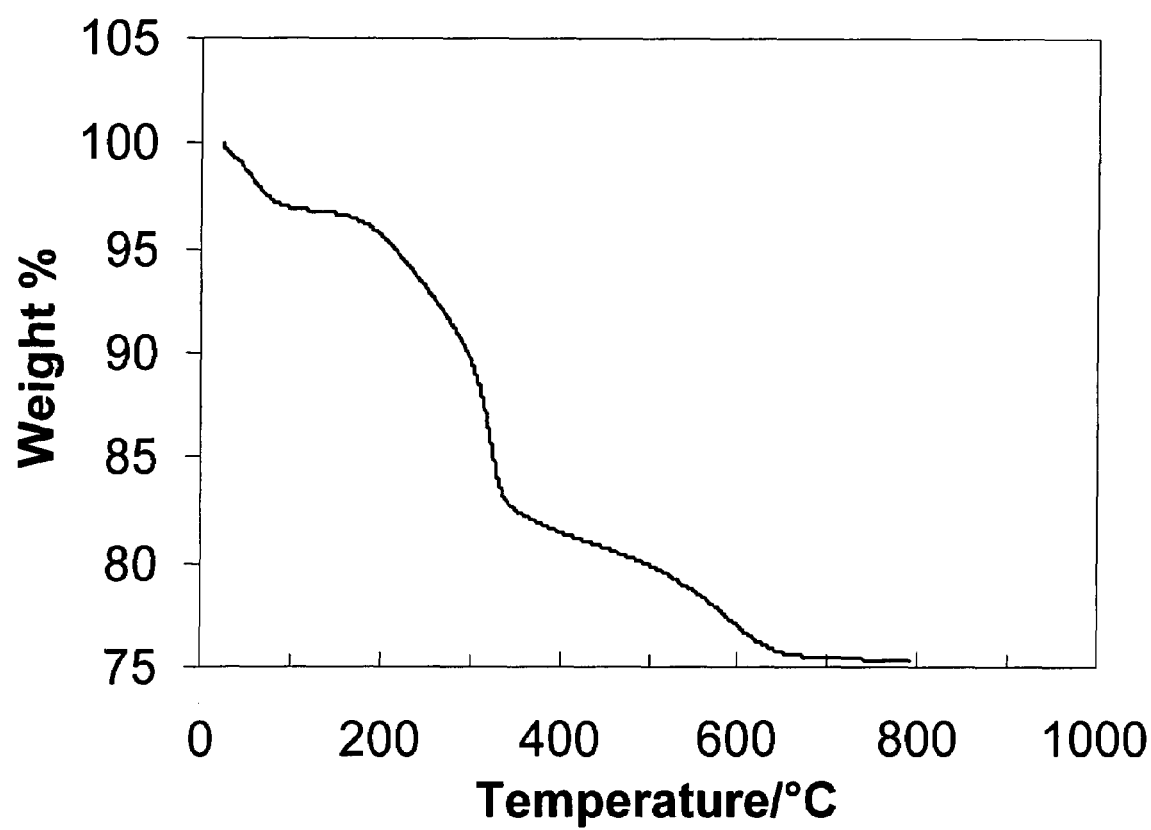
FIG. 1 shows the thermogravimetric analysis obtained for a compound prepared according to the invention.

The present invention relates to a new method of making porous structural materials that are iso-structural to ITQ-21. Up to now, the preparation of ITQ-21 has been reported to take place in the presence of N(16)-methylsparteinium hydroxide as structure directing agent. N(16)-methylsparteinium is prepared from (−)-sparteine, which is a naturally occurring alkaloid.

We have now found that quaternary ammonium compounds of formula $C^1C^2R^1R^2N^+A^-$(I), in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine, can be used as structure directing agents for the preparation of porous structural materials having the crystal structure of ITQ-21, such materials being hereinafter referred to as being iso-structural to ITQ-21.

Examples of suitable $C^1$ and $C^2$ include cyclohexyl, cyclopentyl, methylcyclohexyl, methylcyclopentyl, dimethylcyclohexyl, dimethylcyclopentyl, trimethylcyclohexyl and trimethylcyclopentyl groups.

Examples of suitable rings containing 5 or 6 atoms when $R^1$ and $R^2$ together with the nitrogen atom they are connected to form a ring containing 5 or 6 atoms, include piperidine, pyridine, morpholine, pyrrolidine and pyrrole heterocycles.

Preferred compounds of formula (I) are those that include one or several of the following features:

$C^1$ and $C^2$ both represent a substituted or unsubstituted cyclohexyl group, conveniently an unsubstituted cyclohexyl group;

$R^1$ and $R^2$ each independently represent a methyl group, an ethyl group or a propyl group, A represents hydroxyl.

Non-limiting examples of suitable compounds of formula (I) include N,N-dimethyldicyclohexylammonium salts, conveniently, N,N-dimethyldicyclohexylammonium hydroxide, N,N-diethyldicyclohexylammonium salts, conveniently, N,N-diethyldicyclohexylammonium hydroxide, N,N-dipropyldicyclohexylammonium salts, conveniently, N,N-dipropyldicyclohexylammonium hydroxide, N,N-dimethyldicyclopentylammonium salts, conveniently, N,N-dimethyldicyclopentylammonium hydroxide, N,N-diethyldicyclopentylammonium salts, conveniently N,N-diethyldicyclopentylammonium hydroxide, or N,N-dipropyldicyclopentylammonium salts, conveniently N,N-dipropyldiclopentylammonium hydroxide.

In a particularly preferred embodiment, the structure directing agent is a N,N-dimethyldicyclohexylammonium salt, for example, N,N-dimethyldicyclohexylammonium hydroxide, N,N-dimethyldicyclohexylammonium fluoride, N,N-dimethyldicyclohexylammonium chloride, N,N-dimethyldicyclohexylammonium bromide, N,N-dimethyldicyclohexylammonium iodide.

The method of the present invention comprises the step of providing a synthesis mixture comprising water, at least one source of germanium, at least one source of tetravalent element X other than germanium, at least one structure-directing agent, R, of formula (I), optionally a source of trivalent element Y and optionally a source of fluoride.

The ammonium compounds of formula (I) are either available commercially, or can easily be obtained by the corresponding amines by reaction with an appropriate alkylating agent, according to methods well known in the art.

Examples of suitable germanium sources include germanium ethocide and germanium oxide. The source of germanium is conveniently $GeO_2$. Preferably, X is selected from the group consisting of silicon, boron, titanium, tin, and mixtures thereof. Most preferably, X is silicon. Where the tetravalent element X is silicon, suitable sources of silicon include silicates, e.g., tetraalkyl orthosilicates, fumed silica, such as Aerosil (available from Degussa), and aqueous colloidal suspensions of silica, for example Ludox (DuPont de Nemours), Nyacol (Nyacol Nano Technologies), Nalco (Nalco Chemical Company), Ultra-Sol (RESI Inc), NexSil (available from NNTI).

If used, Y is preferably selected from the group consisting of aluminum, boron, iron, indium, gallium, chromium, and mixtures thereof. Most preferably, Y is aluminum. The sources of tetravalent elements Y are selected from oxides, chlorides, alkoxides, sulfates, phosphates, and mixtures thereof. Where the trivalent element Y is aluminum, suitable sources of aluminum include aluminum salts, especially water-soluble salts, such as aluminum nitrate, as well as hydrated aluminum oxides, such as boehmite and pseudoboehmite.

Optionally, the synthesis mixture also contains a source of fluoride. Suitable sources of fluoride include hydrogen fluoride, although other sources of fluoride such as alkali metal fluorides, or fluoride salts of silicon sources, fluoride salts of aluminum sources or fluoride salts of the organic directing agent may also be used.

The synthesis mixture provided in step a) typically has a composition, in terms of mole ratios of oxides, within the ranges indicated in Table 2:

TABLE 2

| Reactants | Useful | Convenient | Preferred |
| --- | --- | --- | --- |
| $Y_2O_3/(XO_2 + GeO_2)$ | 0 to 1 | 0 to 0.5 | 0 to 0.1 |
| $GeO_2/XO_2$ | 0.001 to 1 | 0.01 to 0.8 | 0.02 to 0.5 |
| $R/(XO_2 + GeO_2)$ | 0.1 to 2.0 | 0.2 to 1.0 | 0.2 to 0.8 |

TABLE 2-continued

| Reactants | Useful | Convenient | Preferred |
|---|---|---|---|
| F/(XO$_2$ + GeO$_2$) | 0.1 to 2.0 | 0.2 to 1.0 | 0.2 to 0.8 |
| H$_2$O/(XO$_2$ + GeO$_2$) | 1.0 to 30 | 2.0 to 20 | 3.0 to 10 |

Conveniently, the reaction mixture has a pH of from about 2 to about 11, such as from about 4 to about 9, for example from about 5 to about 8.

The porous crystalline material is then formed by submitting the synthesis mixture to crystallization conditions. Crystallization can be carried out under either static, tumbled or stirred conditions in a suitable reactor vessel, such as for example, polypropylene jars or Teflon® lined or stainless steel autoclaves, at a temperature in the range of about 50° C. to about 300° C., such as about 135° C. to about 185° C., for a time sufficient for crystallization to occur. Formation of the crystalline product can take anywhere from around 30 minutes up to as much as 2 weeks, such as from about 45 minutes to about 10 days, for example from about 1 day to about 6 days. The duration depends on the temperature employed, with higher temperatures typically requiring shorter hydrothermal treatments. Conveniently, crystallization takes place at a temperature in the range of about 165° C. to about 185° C., for a period of from 1 to about 5 days.

Crystallization may be facilitated by the presence of at least 10 ppm, such as at least 100 ppm, for example at least 500 ppm, conveniently at least 1000 ppm of seed crystals based on total weight of the reaction mixture. If present, it is preferable that the amount of seed crystals does not exceed 3% of the weight of the total weight of the synthesis mixture. The seed crystals can be iso-structural with ITQ-21, for example the product of a previous synthesis, or can be a heterostructural crystalline material. The production of colloidal seed suspensions and their use in the synthesis of molecular sieves are disclosed in, for example, International Publication Nos. WO 00/06493 and WO 00/06494, incorporated herein by reference.

Typically, the crystalline product is formed in solution and can be recovered by standard means, such as by centrifugation or filtration. The separated product can also be washed, recovered by centrifugation or filtration and dried, typically at temperature of less than 200° C.

As a result of the crystallization process, the recovered crystalline product contains within its pores at least a portion of the structure directing agent used in the synthesis, and typically has a composition involving the molar relationship, on an anhydrous basis:

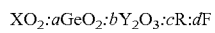
XO$_2$:aGeO$_2$:bY$_2$O$_3$:cR:dF wherein X, Y and R are as defined previously and wherein a ranges from about 0.001 to about 1.0, such as from about 0.01 to about 0.8; b ranges from about 0 to about 1.0, such as from about 0 to about 0.5; c ranges from about 0.01 to about 0.5, such as from about 0.1 to about 0.3; d ranges from about 0.1 to about 1.0, such as from about 0.02 to about 0.5.

The R component, i.e. the organic structure directing agent, and the F component, which are associated with the material as a result of their presence during crystallization, are typically at least partially removed from the molecular sieve by calcination, leaving active catalytic sites within the microporous channels of the molecular sieve open for contact with a feedstock. Calcination consists essentially of heating the molecular sieve comprising the template at a temperature of from about 200° C. to about 800° C. in the presence of an oxygen-containing gas, optionally in the presence of steam. In some cases, it may be desirable to heat the molecular sieve in an environment having a low or zero oxygen concentration, at least for a portion of the calcination process.

After removal of the R and F component, the crystalline product has a composition involving the molar relationship on an anhydrous basis

kXO$_2$:lGeO$_2$:mY$_2$O$_3$ in which X is a tetravalent element other than germanium, Y is a trivalent element, k, l and m respectively represent the molar ratios of XO$_2$, GeO$_2$ and Y$_2$O$_3$, in the porous crystalline material, and in which l/k ranges from about 0.001 to about 1.0, such as from about 0.01 to about 0.8 and m/k ranges from about 0 to about 1.0, such as from 0 to about 0.5. In a specific embodiment, the crystalline materials having crystallite sizes smaller than 100 nanometer, such as smaller than 50 nanometer, typically in the order of 10 to 30 nanometers. The crystallites may be in the form of agglomerates. Very small zeolite or zeolite-type crystallites are of particular interest in many applications, where high surface area and good diffusion are required. Examples of applications where small crystallite sizes are of interest include catalytic processes in which zeolites are coated on a support, use in detergent and washing compositions, use as seeds for the crystallization of homostructural or hetero-structural zeolites. Identification of the crystal structure is conveniently performed by X-ray powder diffraction analysis. In the case of very small crystallites, the X-ray diffraction peaks however tend to be broad.

To the extent desired and depending on the composition of the material, any cations in the as-synthesized or calcined material can be replaced in accordance with techniques well known in the art, at least in part, by ion exchange with other cations. Preferred replacing cations include metal ions, hydrogen ions, hydrogen precursor, e.g., ammonium ions, or mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

Once the crystalline material of the invention has been synthesized, it can be formulated into a catalyst composition by combination with other materials, such as binders and/or matrix materials, that provide additional hardness or catalytic activity to the finished catalyst.

The crystalline materials described herein can be used to dry gases and liquids; for selective molecular separation based on size and polar properties; as ion-exchangers; as chemical carriers; in gas chromatography; and as catalysts in organic conversion reactions. Accordingly, the present invention also relates to hydrocarbon conversion processes in which a catalyst comprising a crystalline material of the invention is contacted under hydrocarbon conversion conditions with a hydrocarbon feedstock, to form a converted hydrocarbon product. For this purpose, the catalyst may contain other active materials in addition to the porous crystalline material of the invention, such as for example, hydrogenation components.

Examples of suitable catalytic uses of the crystalline material described herein include hydrocracking of petroleum feedstocks, hydrogenation processes, for example diesel dewaxing processes, catalytic cracking, for example, fluid catalytic cracking or deep catalytic cracking or the alkylation of aromatic compounds, such as aromatic alkylation.

For example, if used in hydrocracking processes, the crystalline materials of the present invention are preferably in the form of a catalyst containing a hydrogenation compound, such as at least one Group VIB metal, conveniently, molybdenum, tungsten or mixtures thereof, at least one Group VII metal, conveniently, iron, cobalt or nickel, or such as a combination of at least one such Group VIB metal and at least one such Group VIII metal, in addition to the crystalline material of the invention and other formulating agents. The present invention thus also relates to a hydrocracking process, in which a petroleum feedstock is contacted with a catalyst comprising the crystalline material of the invention under hydrocracking conditions. Examples of petroleum fractions suitable for such process include vacuum gas oil, for which, typically, 80% by volume of the hydrocarbon compounds boil above 350° C., such as those having a boiling range between 350° C. and 580° C. Typically, the hydrocarbon feedstocks are brought in contact with the hydrocracking catalyst in the presence of hydrogen, usually in a fixed bed reactor. The hydrocracking conditions can vary depending on the type of feed, the desired product quality, as well as the available commercial facilities. Generally, the feedstock is contacted with the catalyst in the presence of hydrogen at a temperature above 200° C., typically between 250° C. and 480° C., preferably between 300° C. and 500° C. Typical pressures are greater than 0.1 MPa, such as greater than 1 MPa. Preferably, the pressure is between 5 MPa and 20 MPa. The hydrogen to hydrocarbon ratio is usually above 50 m$^3$ and generally between 80 m$^3$ and 5000 m$^3$, such as between 200 m$^3$ and 1500 m$^3$ of hydrogen per m$^3$ of hydrocarbon feed. The space velocity (LHSV) is generally between 0.01 and 20, such as between 0.05 and 5 volumes of feed per volume of catalyst per hour.

The invention shall be further illustrated by the following non-limiting examples.

EXAMPLES

In these examples,

TGA (thermogravimetric analysis) was carried out on a TGA 2950 instrument (TA Instrument) that was fitted with a gas feeding system.

SEM (scanning electron microscopy) was carried out on a Hitachi S-4500 instrument. Powders of a sample were sonicated in methanol, and the suspension was dispensed on an SEM sample holder before being mounted onto the SEM sample stage. The SEM images were typically taken with a voltage of 1-2.5 kV.

XRD (X-ray powder diffraction) patterns were obtained on a Siemens D500 diffractometer with voltage of 40 kV and current of 30 mA, using a copper target and a nickel filter ($\lambda$=0.154 nm).

Elemental analysis of Al, Si, and Ge was performed using Inductively Coupled Plasma (ICP) spectroscopy.

Example 1

Synthesis of N,N-dimethyldicyclohexylammonium hydroxide (DMDCHA$^+$OH$^-$)

To a chilled solution of 100 g N-methyldicyclohexylamine (Aldrich) in 50 g ethanol was slowly added 30 g iodomethane (Aldrich). The mixture became lukewarm. To allow dissipation of heat, fifteen minutes were allowed to elapse while the mixture was chilled in an ice-bath before another 30 g iodomethane was added. A rapid release of heat ensued soon after, followed by crystal precipitation. After the mixture was chilled to ice-bath temperature, an additional 27.2 g iodomethane was added, and the mixture was shaken at room-temperature overnight. Large amounts of white crystals formed, which were recovered by decanting the mother liquor.

The crystals were dissolved in an adequate amount of deionized water and the solution was ion-exchanged with MTO-Dowex SBR LCNG OH Form Ion-Exchanger (Supelco) several times until the solution was tested negative for iodide with AgNO$_3$. The solution was concentrated on a rotary evaporator, and the concentration was determined by titration with 0.1 M HCl solution. Thus, 245 mL (density 1.00 g/mL) of a 1.5737 Molar N,N-dimethyldicyclohexylammonium hydroxide (DMDCHA$^+$OH$^-$) solution was obtained, which represented 78.1% overall synthesis yield.

Example 2

10.42 g tetraethylorthosilicate (TEOS, 99% from Aldrich) was added to 19.86 g of a DMDCHA$^+$OH$^-$ solution as prepared in Example 1. Then, 1.31 g amorphous germanium dioxide powder (99.99%, available from Aldrich) was added to the TEOS-DMDCHA$^+$OH$^-$ mixture. The mixture was sealed in a polypropylene bottle and shaken for 24 hours at room temperature, after which a clear solution was obtained. A 48 wt % aqueous solution of hydrofluoric acid (1.33 g, available from Aldrich) was then added to the clear solution, which resulted in immediate precipitation. This slurry was homogenized by vigorous shaking, and was then poured into a plastic dish for water and ethanol evaporation at room temperature. A stream of nitrogen was directed toward the mixture to facilitate evaporation. The evaporation step was terminated once the weight of the mixture reached 15.0 g. This resulting mixture had the following composition:

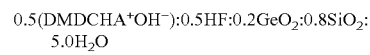

0.5(DMDCHA$^+$OH$^-$):0.5HF:0.2GeO$_2$:0.8SiO$_2$: 5.0H$_2$O

The mixture was divided into two equal portions and transferred to two Teflon lined 23 ml autoclaves. Each portion was heated at 170° C. for 3 and 5 days, respectively, while being tumbled (40 rpm). The solid product was recovered by centrifugation, washing with distilled water and drying in a 50° C. vacuum oven. The products recovered from the autoclaves weighed 2.20 g and 2.40 g, respectively. TGA of the product with three days of crystallization is shown in FIG. 1, which shows that the structure directing agent was completely removed after heating up to 700° C., using a heat up ramp of 10° C./minute, with a total weight loss of 24.7%.

Samples of each product were calcined following this protocol:

(1) In a muffle furnace, heat from room temperature to 400° C. at 10° C./min in flowing N$_2$, (2) Hold at 400° C. for 30 minutes in flowing N$_2$, (3) Heat at 10° C./min to 650° C. in flowing air, (4) Hold at 650 for 5 hours in flowing air.

Figure 2:
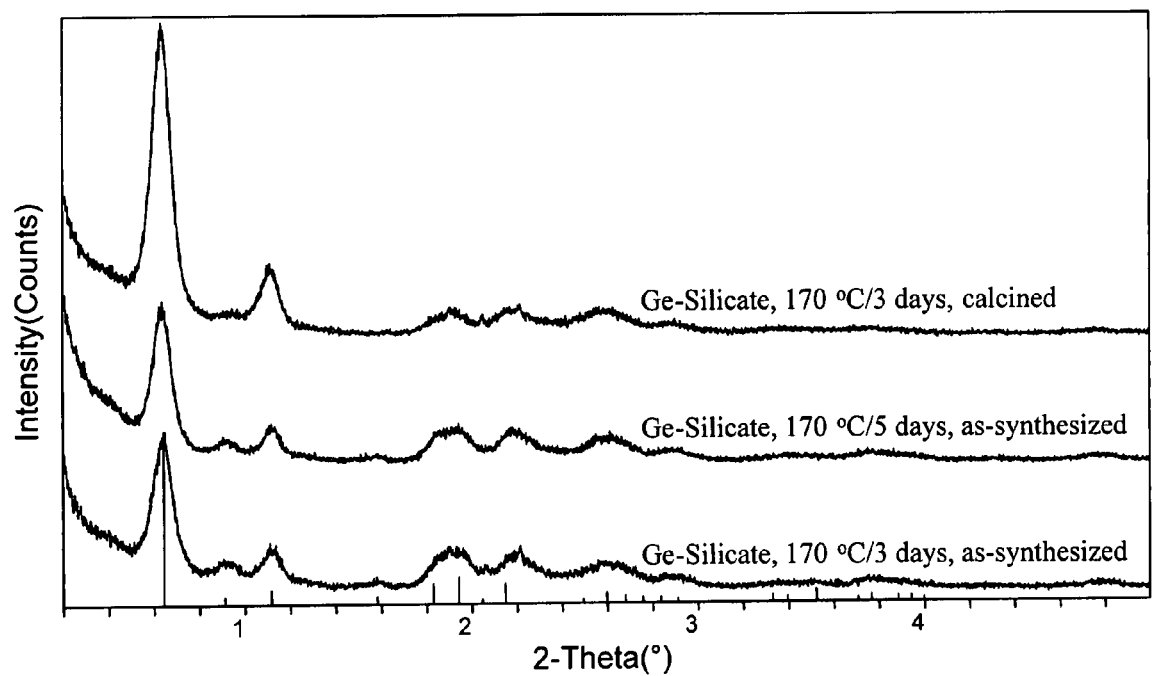
FIG. 2 shows the X-ray powder diffraction pattern of nanoscale crystalline materials of the invention, with vertical bars showing the positions and relative intensity of the peaks reported in the literature for ITQ-21.

X-ray diffraction patterns of the as-synthesized and calcined products (shown in FIG. 2, in which the vertical bars indicate the characteristic X-ray diffraction lines for ITQ-21) had peaks at the characteristic d values and degrees 2 θ angles reported for calcined ITQ-21. The X-ray diffraction peaks were however broad. The XRD peak broadening is indicative of a small crystal size. XRD peak broadening due to small crystal size is described by the Sherrer equation: D=k$\lambda$/Bcos$\theta$, where D is the diameter of a crystal, $\lambda$ is the X-ray wavelength, B is the half-width of the diffraction peak corrected for instrument broadening, and θ is the diffraction angle. See Azaroff, L. V., Elements of X-ray Crystallography, McGraw-Hill Book Company, New York, 1968, p. 552.

Elemental analysis yielded 23.3% Si and 14.7% Ge for the five days crystallization sample (hereinafter referred to as Sample A), which corresponds to a molar composition of $Ge_{100}Si_{4.10}$.

Comparative Example

The procedure of Example 2 was reproduced, except no germanium oxide was added. The synthesis mixture before hydrothermal synthesis was:

$$0.5(DMDCHA^+OH^-):0.5HF:1.0SiO_2:5.0H_2O$$

The mixtures were sealed in two Teflon lined 23-ml autoclaves, which were then heated at 170° C. for 3 and 5 days while being tumbled at 40 rpm. The products were recovered as described in Example 2. XRD analysis of the product indicated that the products have the BEA* framework type.

Example 3

Two synthesis mixtures were prepared following the procedure of Example 2, except that a 20 wt % aqueous solution of $Al(NO_3)_3 \cdot 9H_2O$ was added as an aluminum source to the synthesis mixture. The synthesis mixtures had the following compositions before hydrothermal synthesis:

$$0.5(DMDCHA^+OH^-):0.5HF:0.2GeO_2:xAl_2O_3:$$
$$0.8SiO_2:5.0H_2O \ (x=0.01 \text{ or } 0.02)$$

To these mixtures was added 0.25 wt % seeds, relative to the total weight of synthesis mixture, the seeds being the material produced in Example 2. The mixtures were sealed in Teflon lined 23-ml autoclaves, which were then heated at 170° C. for 3 days while being tumbled at 40 rpm. The products were recovered and calcined as described in Example 2.

Figure 3:
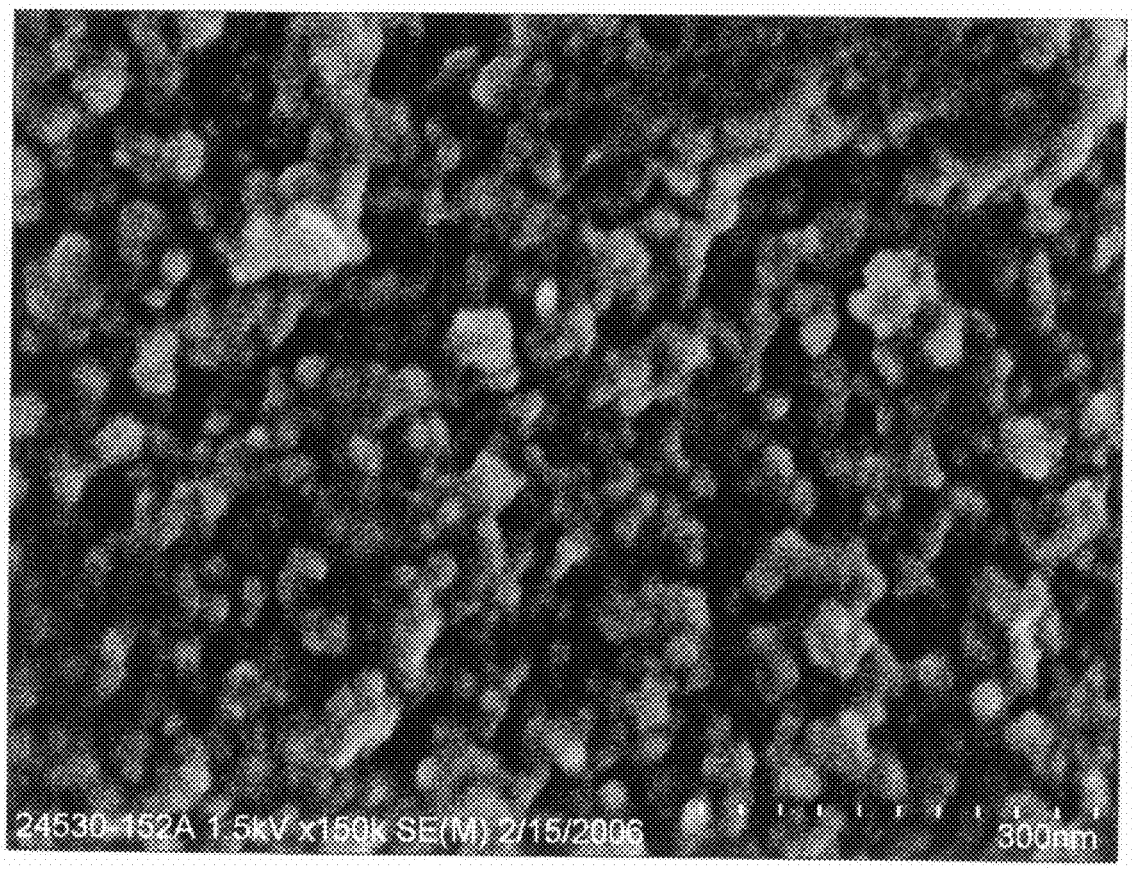
FIG. 3 shows a SEM micrograph obtained for a nanoscale crystalline material of this invention.
Figure 4:
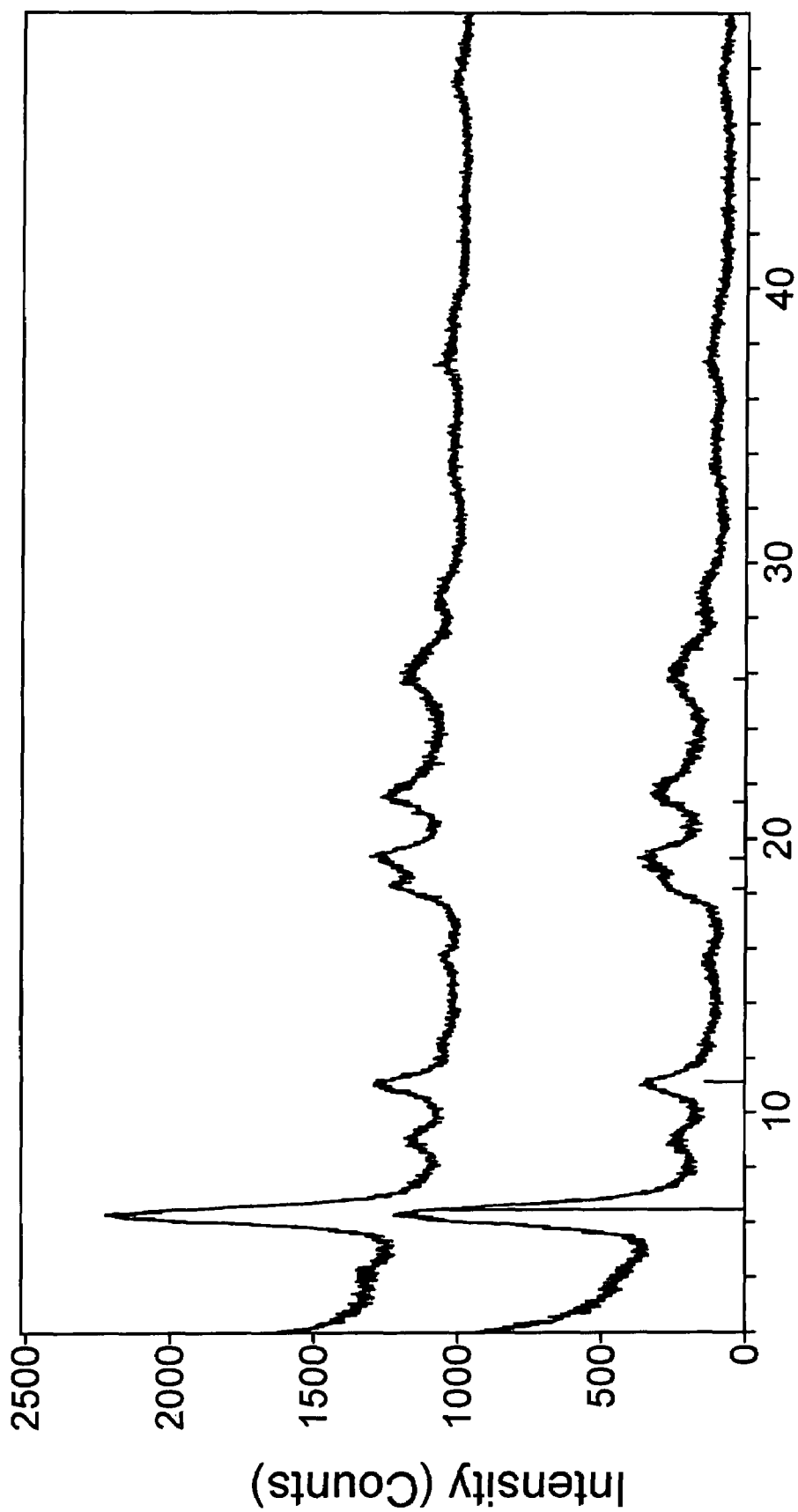
FIG. 4 shows the X-ray powder diffraction pattern of nanoscale crystalline materials of the invention, with vertical bars showing the positions and relative intensity of the peaks reported in the literature for ITQ-21.

SEM pictures of the calcined product (shown in FIG. 3 for the x=0.02 case) indicated that the solid product consisted of micron-size agglomerates of small crystallites, measuring about 10 to 20 nm. X-ray diffraction patterns of the as-synthesized products (Shown in FIG. 4) were essentially the same as that from Example 2, with X-ray diffraction peaks broadened due to the small crystallite sizes.

Elemental alnalysis of the product obtained with x=0.01 in the synthesis mixture gave an Al content of 0.042%, a Ge content of 15.1% and an Si content of 23.9%. This corresponds to a molar composition of $Al_{0.00183}Ge_{1.00}Si_{4.09}$. This product shall be hereinafter referred to as Sample B.

Elemental analysis of the product obtained with x=0.02 in the synthesis mixture, gave an Al content of 0.100%, a Ge content of 15.2% and a Si content of 23.7%. This corresponds to a molar composition of $Al_{0.00438}Ge_{1.00}Si_{4.03}$. This product shall be hereinafter referred to as Sample C.

Example 4

The procedure of Example 2 was repeated, except 0.2 wt % seeds (product of Example 2), relative to the total weight of the synthesis mixture, were used. In a first experiment, crystallization was carried out for 3 days. The XRD pattern of the as-synthesized product was identical to the XRD pattern of the as-synthesized products obtained in Example 2. In a second experiment, crystallization was carried out for 7 days. The XRD pattern of the as-synthesized product indicated new sharp peaks, characteristic of nonasil, in addition to the broad XRD features of the product obtained in Example 2.

Example 5

Sorptive and catalytic properties of Samples A, B, C were evaluated as follows:

Adsorption of n-hexane, methanol, and mesitylene was conducted on the Thermogravimetric Analysis (TGA) unit. A calcined sample was first degassed at 400° C. (10° C./minute ramp) until constant weight was attained before the sample was allowed to cool to a preset temperature in flowing dry nitrogen. For n-hexane, methanol, and mesitylene adsorption, the temperature was 90° C., 35° C., and 100° C., respectively. Then the adsorbate vapor (90, 203, and 2.0 torr for n-hexane, methanol, and mesitylene, respectively), carried with nitrogen, was admitted into the TGA sample chamber. A constant weight gain was typically achieved within 15 minutes, yet additional 60 minutes were allowed to ensure equilibration. Data were reported as weight gain as the weight percent of the anhydrous catalyst.

The samples were also evaluated for as catalysts for n-hexane cracking in an α-test. In the α-test, a stream of feed molecules (n-hexane) was fed under 1 atm pressure to a stainless-steel tube-reactor housed in an isothermally heated zone at 538° C. The feed rate was adjusted so that n-hexane conversion to cracked products was below 20%. The tube-reactor contained approximately 20 mg freshly calcined, weighed and sieved granules of catalyst sample (20-40 mesh by the press-and-screen method). The catalyst was activated for 30 minutes at the test temperature in flowing nitrogen before feed was admitted into the testing unit. The product effluent was sampled and analyzed with a Gas Chromatograph equipped with an FID detector. The first order rate constant for n-hexane was ratioed over that of a silica-alumina standard catalyst, which has an alpha value of unity.

BET surface area was measured on a commercially available OmniSorb instrument under standard operating conditions. The results obtained for Samples A, B and C are shown in Table 3.

TABLE 3

| Sample | n-hexane uptake, % 90° C., 90 Torr | MeOH uptake, % 35° C., 203 Torr | mesitylene uptake, % 100° C., 2 Torr | BET surface area $m^2/g$ | α-test value |
|---|---|---|---|---|---|
| A | 9.39 | 12.15 | 8.9 | 842 | — |
| B | 8.84 | 9.05 | 4.5 | 781 | 3.9 |
| C | 8.76 | 9.07 | 4.3 | 804 | 4.2 |

The adsorption and alpha-test results clearly indicate that the new material has high surface area, good adsorption capacity for large molecules, and good cracking activity.

What is claimed is:

1. A method of making a crystalline material iso-structural to ITQ-21, the method comprising:
   (a) providing a synthesis mixture comprising water, at least one source of germanium, at least one source of a tetravalent element X other than germanium, at least one structure directing agent R, optionally at least one source of trivalent element Y and optionally at least one source of fluoride, wherein the structure directing agent R is a compound of formula $C^1C^2R^1R^2N^+A^-$ (I),
   in which
      $C^1$ and $C^2$ each independently represent a substituted or unsubstituted cyclohexyl or cyclopentyl group, R¹ and R² each independently represent a methyl group, an ethyl group or a propyl group, or R¹ and R² together with the nitrogen atom they are connected to form a ring containing 5 or 6 atoms, and A represents hydroxyl, fluorine, chlorine, bromine or iodine, (b) forming said crystalline material from the synthesis mixture;

(c) recovering said crystalline material.

2. The method of claim 1, wherein the synthesis mixture further comprises from about 10 ppm to about 3% of seed crystals, based on the total weight of the synthesis mixture.

3. The method of claim 1, wherein step (b) takes place at a temperature in the range of from about 135° C. to about 185° C. for a duration of from about 1 day to about 6 days in a sealed vessel.

4. The method of claim 1, further comprising a step of calcining said crystalline material.

5. The method of claim 1, wherein C¹ and C² both represent a cyclohexyl group.

6. The method of claim 1, wherein R¹ and R² each independently represent a methyl group, an ethyl group or a propyl group.

7. The method of claim 1, wherein A represents hydroxyl.

8. The method of claim 1, wherein the compound of formula (I) is a N,N-dimethyldicyclohexylammonium salt.

9. The method of claim 1, wherein the compound of formula (I) is N,N-dimethyldicyclohexylammonium hydroxide.

10. The method of claim 1, wherein X is selected from silicon, boron, titanium, tin, and mixtures thereof.

11. The method of claim 1, wherein X is silicon.

12. The method of claim 1, wherein Y is selected from aluminum, boron, iron, indium, gallium, chromium, and mixtures thereof.

13. The method of claim 1, wherein Y is aluminum.

14. The method of claim 1, wherein the synthesis mixture provided in step a) has a composition in terms of mole ratios of oxides, within the following ranges:

| Reactants | |
|---|---|
| $Y_2O_3/(XO_2 + GeO_2)$ | 0 to 1 |
| $GeO_2/XO_2$ | 0.001 to 1 |
| $R/(XO_2 + GeO_2)$ | 0.1 to 2 |
| $F/(XO_2 + GeO_2)$ | 0.1 to 2 |
| $H_2O/(XO_2 + GeO_2)$ | 1.0 to 30. |

15. The method of claim 14, wherein the $Y_2O_3/(XO_2+GeO_2)$ molar ratio in the synthesis mixture ranges from 0 to 0.5.

16. The method of claim 14, wherein the molar ratio $GeO_2/XO_2$ in the synthesis mixture ranges from 0.01 to 0.8.

17. The method of claim 14, wherein the molar ratio $R/(XO_2+GeO_2)$ in the synthesis mixture ranges from 0.2 to 1.0.

18. The method of claim 14, wherein the molar ratio $F/(XO_2+GeO_2)$ in the synthesis mixture ranges from 0.2 to 1.0.

19. The method of claim 14, wherein the molar ratio $H_2O/(XO_2+GeO_2)$ in the synthesis mixture ranges from 2 to 20.

20. A crystalline material isostructural to ITQ-21 having a composition involving the molar relationship, on an anhydrous basis, $XO_2:aGeO_2:bY_2O_3:cR:dF$ wherein X is a tetravalent element other than germanium, Y is a trivalent element, R is a compound of formula $C^1C^2R^1R^2N^+A^-$ (I), in which C¹ and C² each independently represent a substituted or unsubstituted cyclohexyl or cyclopentyl group, R¹ and R² each independently represent a methyl group, an ethyl group or a propyl group, or R¹ and R² together with the nitrogen atom they are connected to form a ring containing 5 or 6 atoms, and A represents hydroxyl, fluorine, chlorine, bromine or iodine, and wherein a ranges from about 0.001 to about 1.0; b ranges from about 0 to about 1.0; c ranges from about 0.01 to about 0.5; and d ranges from about 0.1 to about 1.0.

21. The crystalline material of claim 20, wherein a ranges from about 0.01 to about 0.8.

22. The crystalline material of claim 20, wherein b ranges from about 0 up to about 0.5.

23. The crystalline material of claim 20, wherein c ranges from about 0.1 up to about 0.3.

24. The crystalline material of claim 20, wherein d ranges from about 0.02 to about 0.5.

25. The crystalline material of claim 20, wherein C¹ and C² both represent a cyclohexyl group.

26. The crystalline material of claim 20, wherein R¹ and R² each independently represent a methyl group, an ethyl group or a propyl group.

27. The crystalline material of claim 20, wherein A represents hydroxyl.

28. The crystalline material of claim 20, wherein the compound of formula (I) is a N,N-dimethyldicyclohexylammonium salt.

29. The crystalline material of claim 20, wherein the compound of formula (I) is N,N-dimethyldicyclohexylammonium hydroxide.

30. The crystalline material of claim 20, wherein X is selected from silicon, boron, titanium, tin, and mixtures thereof.

31. The crystalline material of claim 20, wherein X is silicon.

32. The crystalline material of claim 20, wherein Y is selected from aluminum, boron, iron, indium, gallium, chromium, and mixtures thereof.

33. The crystalline material of claim 20, wherein Y is aluminum.

34. A crystalline material iso-structural to ITQ-21 having the composition involving the molar relationship, on an anhydrous basis $kXO_2:lGeO_2:mY_2O_3$ in which X is a tetravalent element other than germanium; Y is a trivalent element; k, l, and m, respectively, represent the molar ratios of $XO_2$, $GeO_2$, and $Y_2O_3$ in the porous crystalline material, and in which l/k ranges from about 0.001 to about 1.0, and m/k ranges from about 0.000225 to about 1.0, wherein the crystalline material has crystalline sizes ranging from 3 nm to less than 100 nm.

35. The crystalline material of claim 34, wherein l/k ranges from about 0.01 to about 0.8.

36. The crystalline material of claim 34, wherein m/k ranges from about 0 to about 0.5.

37. The crystalline material of claim 34, wherein the crystalline material has crystallite sizes ranging from 5 nm to 75 nm.

38. The crystalline material of claim 34, wherein the crystalline material has crystallite sizes ranging from 5 nm to 50 nm.

39. The crystalline material of claim 34, wherein the crystalline material is an agglomerate of crystallites.

40. The crystalline material of claim 34, wherein X is selected from silicon, boron, titanium, tin, and mixtures thereof.

41. The crystalline material of claim 34, wherein X is silicon.

42. The crystalline material of claim 34, wherein Y is selected from aluminum, boron, iron, indium, gallium, chromium, and mixtures thereof.

43. The crystalline material of claim 34, wherein Y is aluminum.

44. A hydrocarbon conversion process comprising the step of contacting a hydrocarbon feedstock with a catalyst comprising a crystalline material prepared by a method comprising:
(a) providing a synthesis mixture comprising water, at least one source of germanium, at least one source of a tetravalent element X other than germanium, at least one structure directing agent R, optionally at least one source of trivalent element Y and optionally at least one source of fluoride, wherein the structure directing agent R is a compound of formula $C^1C^2R^1R^2N^+A^-$ (I),
in which $C^1$ and $C^2$ each independently represent a substituted or unsubstituted cyclohexyl or cyclopentyl group, $R^1$ and $R^2$ each independently represent a methyl group, an ethyl group or a propyl group, or $R^1$ and $R^2$ together with the nitrogen atom they are connected to form a ring containing 5 or 6 atoms, and A represents hydroxyl, fluorine, chlorine, bromine or iodine, (b) forming said crystalline material from the synthesis mixture;
(c) recovering said crystalline material;
(d) calcining said crystalline material.

45. A hydrocarbon conversion process comprising the step of contacting a hydrocarbon feedstock with a catalyst comprising a crystalline material iso-structural to ITQ-21 having the composition involving the molar relationship, on an anhydrous basis $$kXO_2:lGeO_2:mY_2O_3$$

in which X is a tetravalent element other than germanium; Y is a trivalent element; k, l, and m, respectively, represent the molar ratios of $XO_2$, $GeO_2$, and $Y_2O_3$ in the porous crystalline material, and in which l/k ranges from about 0.001 to about 1.0, and m/k ranges from about 0.000225 to about 1.0, wherein the crystalline material has crystalline sizes ranging from 3 nm to less than 100 nm.

* * * * *